Figure 1:
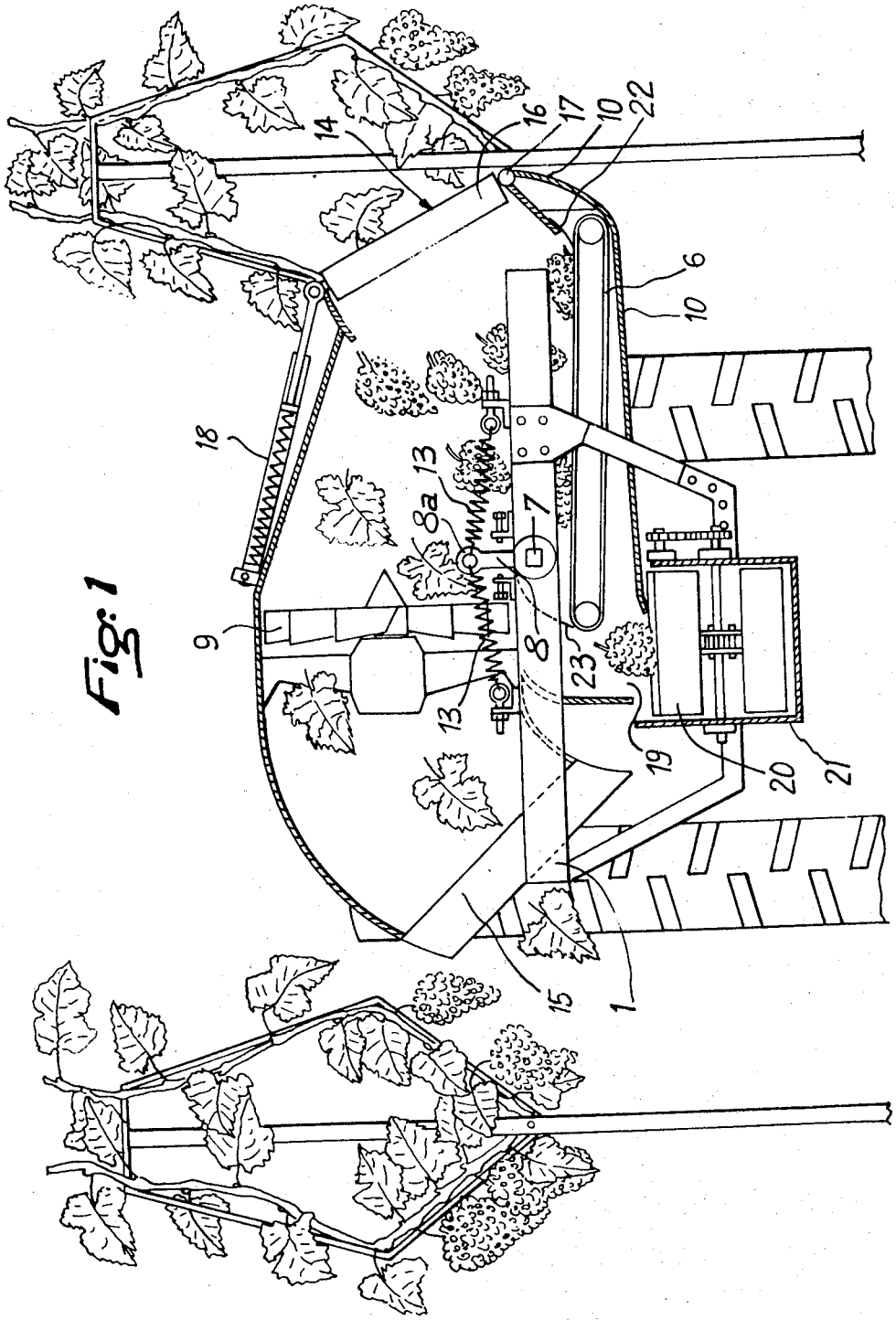

United States Patent
Paillou

[11] 3,766,724
[45] Oct. 23, 1973

[54] GRAPE HARVESTER
[76] Inventor: René Paillou, Bouteville Par Chateauneuf-sur-Charente, France
[22] Filed: Dec. 13, 1971
[21] Appl. No.: 207,317

[30] Foreign Application Priority Data
Dec. 24, 1970 France .............................. 7046644

[52] U.S. Cl. ............................................... 56/331
[51] Int. Cl. ........................................... A01g 19/00
[58] Field of Search ...................... 56/331, 330, 327

[56] References Cited
UNITED STATES PATENTS
| | | | |
|---|---|---|---|
| 2,893,194 | 7/1959 | Lamouria | 56/331 |
| 3,328,944 | 7/1967 | Shepardson | 56/331 |
| 3,546,856 | 12/1970 | Hiyama | 56/330 |
| 3,559,386 | 2/1971 | Popor et al. | 56/331 |
| 3,563,016 | 2/1971 | Tolochko et al. | 56/331 |

FOREIGN PATENTS OR APPLICATIONS
| | | | |
|---|---|---|---|
| 1,460,141 | 10/1966 | France | 56/331 |
| 1,529,620 | 5/1968 | France | 56/331 |
| 1,584,603 | 11/1969 | France | 56/331 |

Primary Examiner—Russell R. Kinsey
Attorney—Pierce, Scheffler et al.

[57] ABSTRACT

A grape harvester adapted to cut off the grapes from a vine carried by a sloping trellis comprises an elongated casing arranged transversely, one end of which is provided with an input port cooperating with the grape cutting tool while a fan blows a draft of air through the casing to urge the leaves cut with the grapes through a corresponding output port and a conveyor belt leads the cut grapes to another corresponding output, the grapes dropping finally onto a longitudinal conveyor belt leading them to the exhaust. The casing is advantageously adapted to execute limited pivotal and longitudinal movement.

14 Claims, 10 Drawing Figures

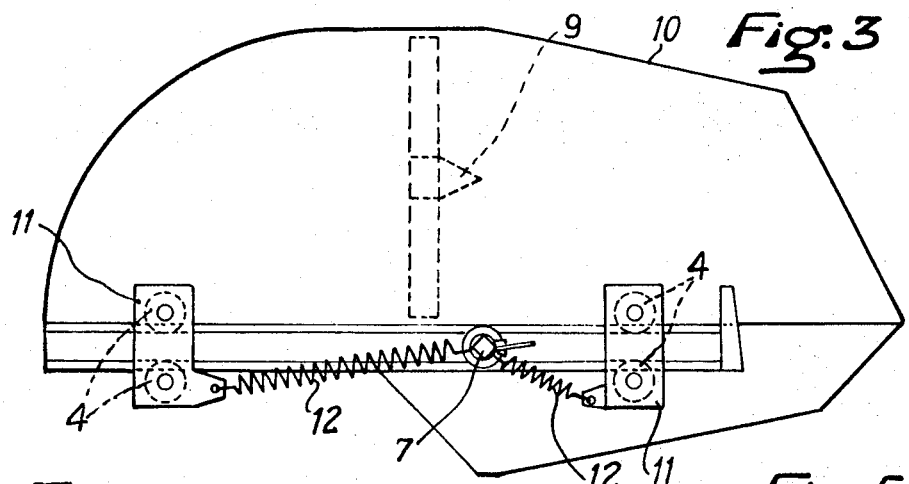
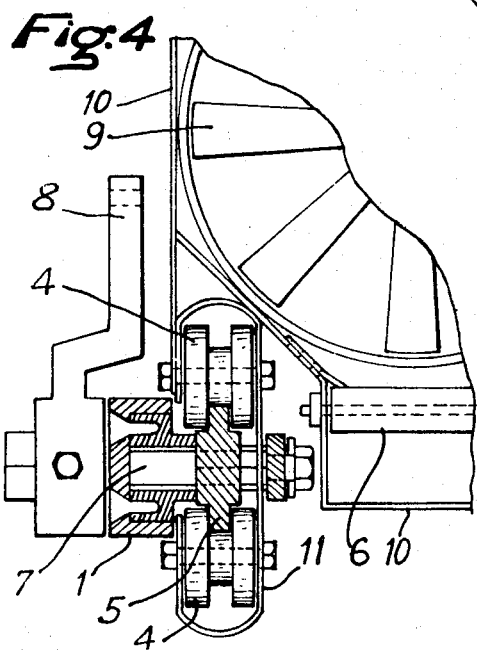
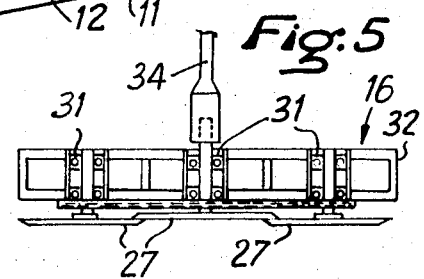
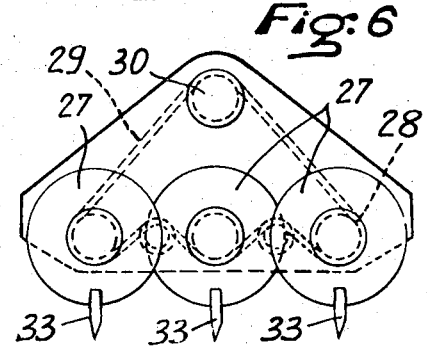
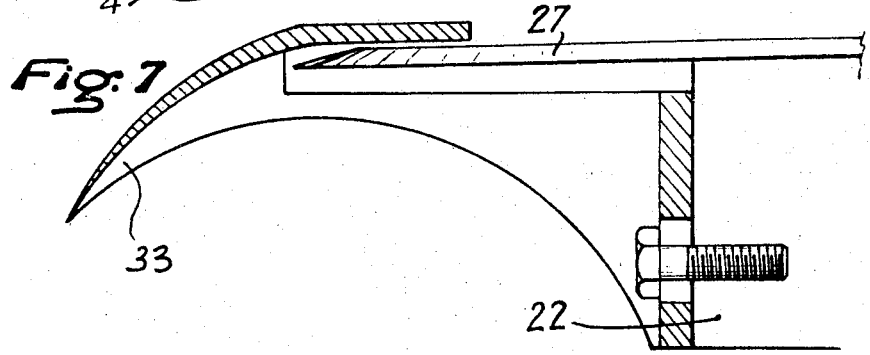

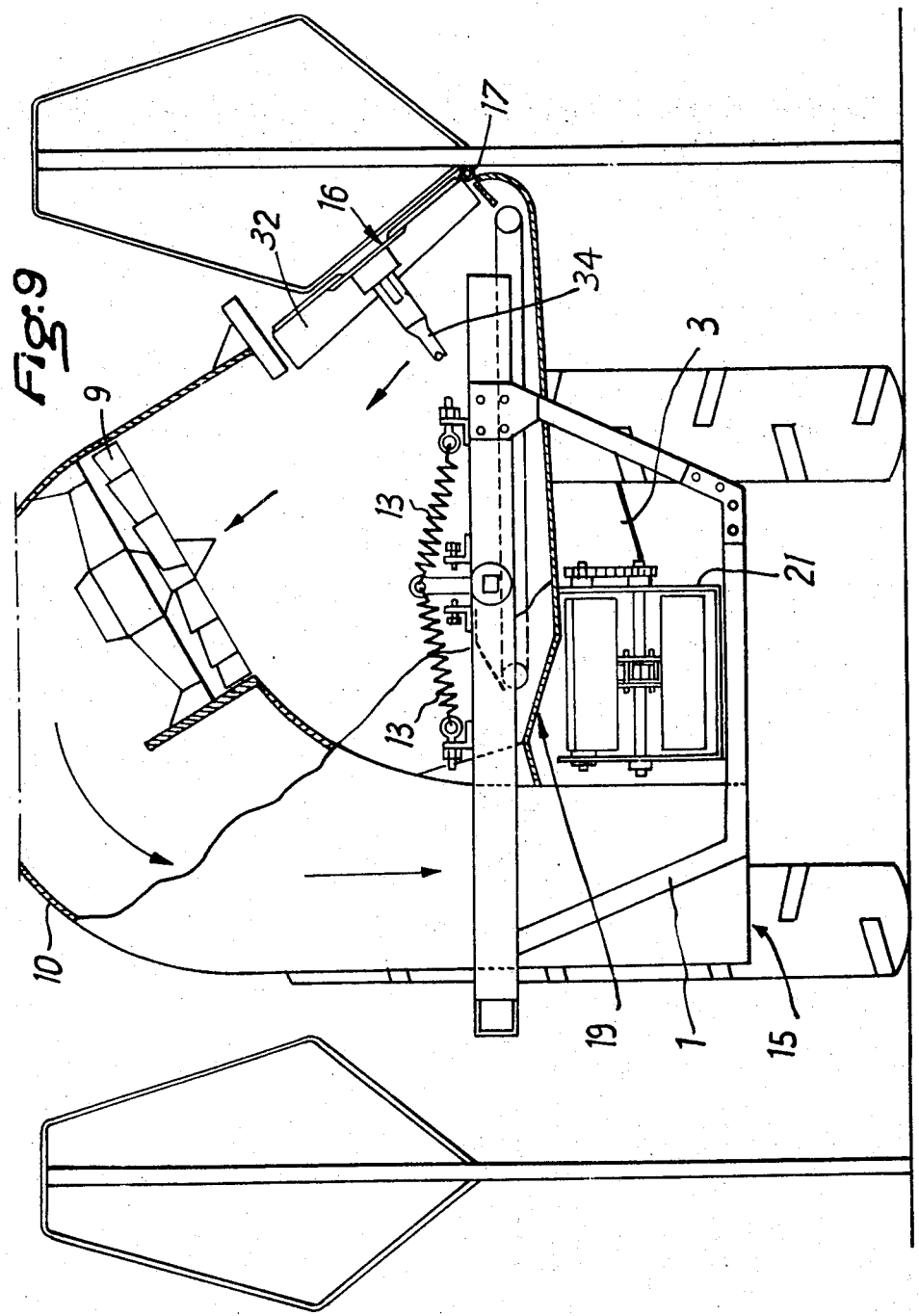

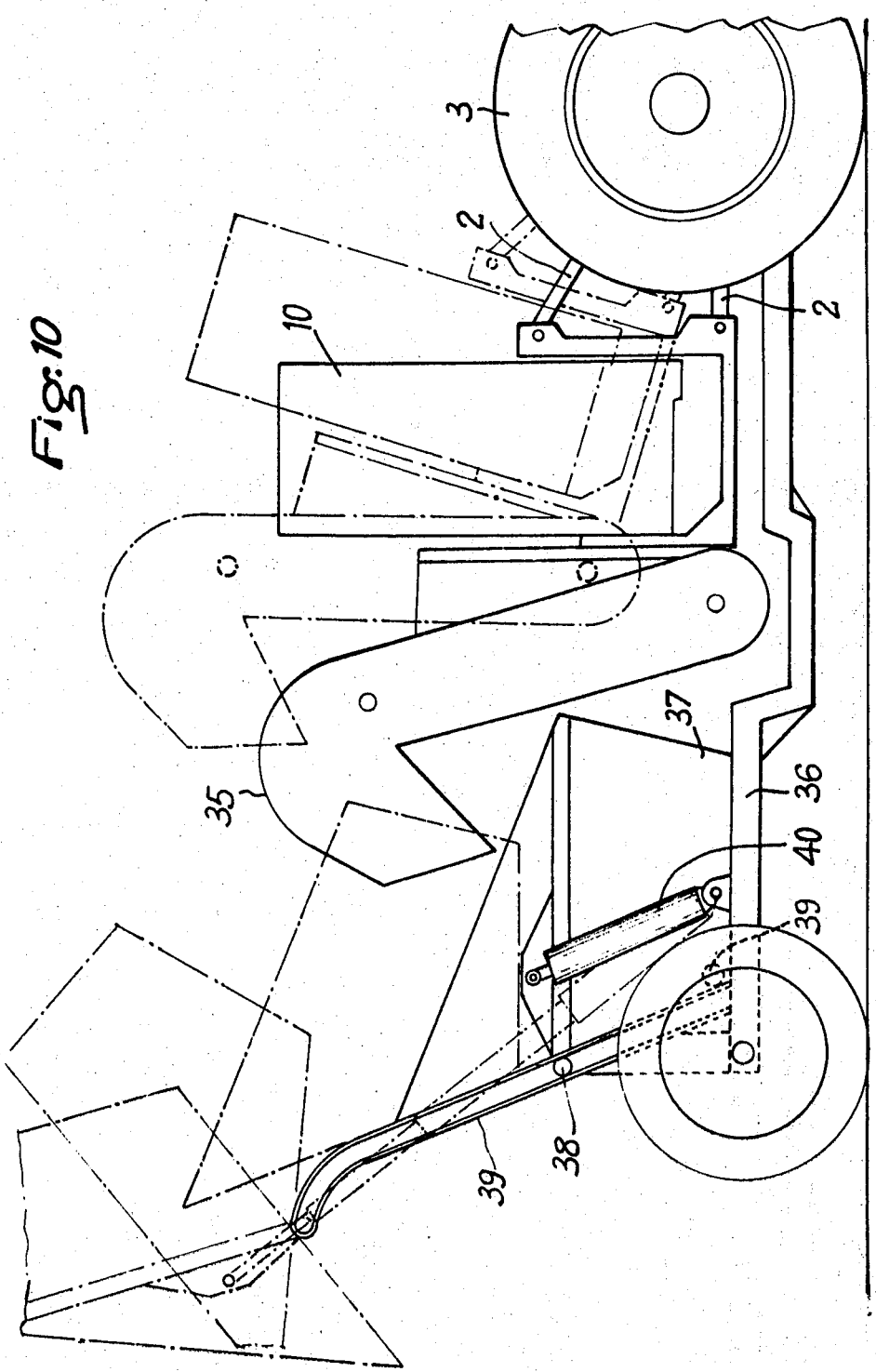

GRAPE HARVESTER

This invention relates to machines for harvesting crops of clustered fruits and is concerned with the provision of an improved grape harvester adapted to harvest grapes from vines supported on trellises.

Applicant's French Pat. No. 1584 603 describes a grape harvester including a chassis carried by the three-point coupling means of a tractor, a hopper secured to said chassis and projecting laterally with reference to the tractor, a cutting tool overhanging the hopper and carried by a support adapted to slide along a vertical guide and raising means adapted to remove the grapes dropping into said hopper. This machine was intended for the cutting and collecting of grape bunches hanging from a substantially horizontal trellis carried by posts in the shape of a T or of an inverted L.

However, it has been found that whereas a vine could grow suitably on broad horizontal trellises of the so-called Pergola type, narrow trellises such as that required for the use of the machine disclosed in applicant's above mentioned Patent were not suitable. Furthermore the different cutting tools described is said patent and its addition have proved to be defective in use.

The present invention has for its object a grape harvester designed mainly on the same general ideas as those appearing in said prior patent, but modified so as to gather grapes extending in an oblique plane.

Figure 2:
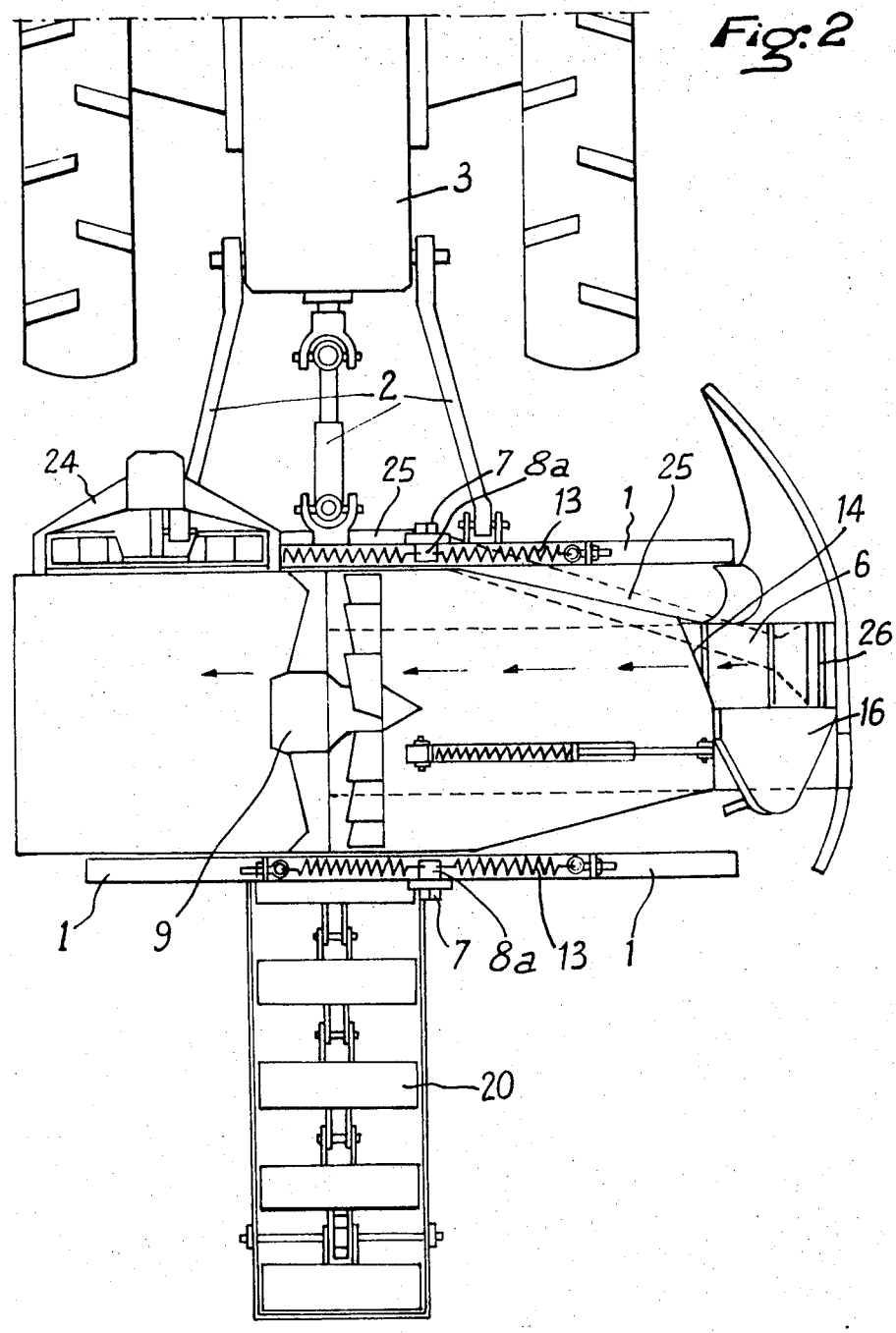
Figure 8:
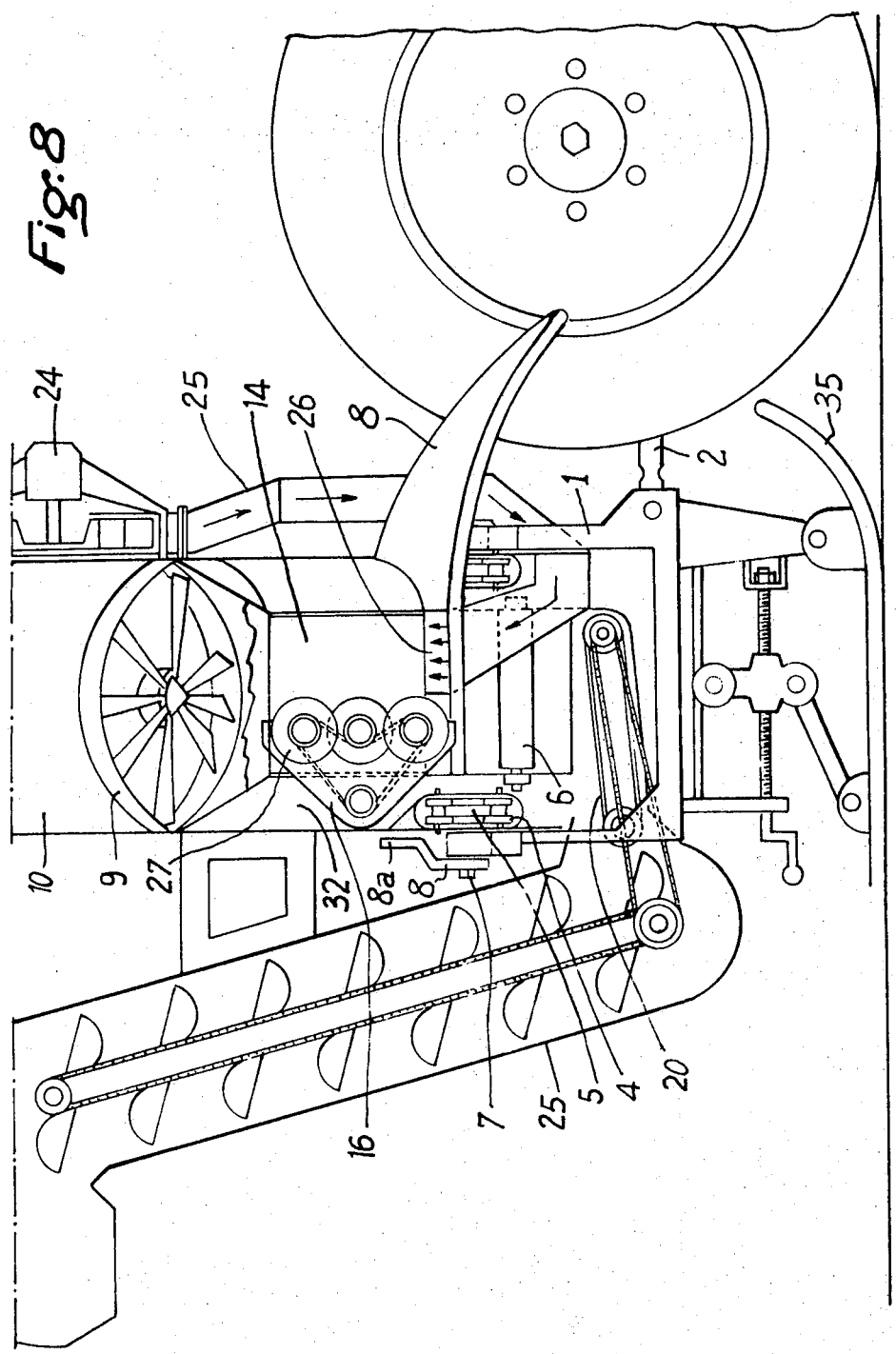

By way of example and with a view to further the understanding of my invention, I have illustrated in the accompanying drawings:

in FIG. 1 a general view from the rear of a first embodiment of a grape harvester according to my invention;

in FIG. 2 a plan view from above of said machine;

in FIG. 3 a view of a detail of the machine illustrated in FIGS. 1 and 2;

in FIG. 4 a sectional view on a larger scale of a part of said detail;

in FIG. 5 a detailed plan view of the cutting tool;

in FIG. 6 a front view of the cutting tool illustrated in FIG. 5;

in FIG. 7 a sectional view on a larger scale of a protecting projection forming part of said cutting tool;

in FIG. 8 a general side view of a second embodiment of my improved grape harvester;

in FIG. 9 a view from the rear of the machine illustrated in FIG. 10;

in FIG. 10 a side elevational view of a grape harvester associated with an oscillatable bucket.

Turning first to FIGS. 1 to 4, it is apparent that the machine includes a chassis 1 carried by the three-point coupling means 2 of a tractor 3. Said chassis 1 carries a tunnel-shaped casing 10 enclosing a conveyor belt 6 and a fan 9.

The casing 10 carries a plurality of pairs of rollers 4 (FIGS. 3 and 4) adapted to run along the upper and lower edges of a rail 5 pivotally secured to the chassis 1 through the spindle 7 to the end of which is keyed a link 8.

The rollers of each pair are fitted through the agency of fittings 11 secured through springs 12 to the spindle 7 while the outer end 8a of the link 8 is secured by antagonistic springs 13,13 to the chassis 1. Thus the casing 10 may both rock elastically round the spindle 7 and move translationally along the rail 5 against the action of the springs 13,13. The casing 10 is provided with an input opening 14 and with an output port 15, while a cutting tool diagrammatically illustrated at 16 and described hereinafter with further detail extends through a part of the input port 14. Said cutting tool is pivotally secured at its lower end via pivot 17 to the casing while its upper end is held in position by a spring-urged link 18.

The conveyor belt 6 extends over the bottom of the casing 10 between a point underneath the input port 14 and an auxiliary port 19 located over a second conveyor belt 20 progressing inside a fluid tight chute 21 towards the rear substantially in alignment with the tractor axis. Two flaps 22 and 23 are fitted at the corresponding ends of the conveyor belt 6.

The casing 10 serves also as a support for a second fan 24, delivering air into a channel 25 opening into a flat nozzle 26 located underneath and just to the front of the cutting tool 16, said nozzle being directed upwardly.

Turning now to FIGS. 5, 6 and 7, it is apparent that the cutting tool 16 is constituted by three circular identical blades 27 overlapping one another by a small amount and fitted on three parallel coplanar spindles. Each blade 27 is rigid with a pinion 28 meshing with a common chain 29 driven by the driving pinion 30. The different pinion axes are carried by roller bearings 31 fitted inside an oil-filled tank 32. The latter carries the protecting projections 33 (FIGS. 6 and 7 preventing any vines from engaging the blades 27. The driving pinion 30 is driven by a cable enclosed within a flexible sheath 34 connected with a power output (not shown) on board the tractor.

Preferably the vanes of the fan 9 are provided with sharp cutting edges and revolve at a high speed of say about 2,500 r.p.m.

The operation of the machine thus described is as follows: during transportation, the machine is carried along by the tractor 3, the raising and coupling means of which are set in their higher position. When the machine is to operate, the raising and coupling means 2 are lowered so that the cutting tool 16 may register with the oblique plane in which the grapes hang. As the tractor moves along the oblique trellis, the cutting tool passes in front of the grapes; at the same time, the grapes are subjected to the upward blast of air issuing from the nozzle 26, so that they are slightly raised and consequently assume in practice a position substantially perpendicular to the plane in which the cutting is performed, which furthers the operation of the blades 27 cutting the stems of the grape clusters and of the leaves. When the clusters are cut, they are drawn into casing 10 by the suction produced by fan 9, and drop onto the conveyor belt 6 either directly or else over the sloping plane defined by the flap 22, and whence the grapes drop onto said conveyor belt. The latter carries the grapes inwardly of the casing where they then raise the other flap 23 and drop onto the longitudinal conveyor belt 20 which leads the grapes thus collected to an elevator or to a bucket which is not illustrated. The cut leaves are sucked off the belt by the fan 9 and thrown outwardly through the port 15; the leaves impinging on the fan vanes are cut further by the vanes and cannot adhere to the latter. Unavoidably, a number of leaves are carried along with the grapes, but a large fraction of such leaves is sucked out through the port 19 by reason of the draft blowing through it.

It is also possible to place the fan 9 within the output port 15 in order to reduce the operative size of the auxiliary port 19 and to prevent the grapes from being carried along by the draft produced by the fan.

The trellis from which the grapes hang may be the one described and shown herein; however, whatever type of trellis is used, unavoidably a number of grape bunches catch the blades 27; but since these blades are not toothed or serrated, the grapes cannot be slashed and are cut off in a clean manner without any juice being lost in practice.

FIGS. 8 and 9 illustrate a modified embodiment wherein parts similar to those previously described carry the same reference numbers. It may be found that the size of the casing of the embodiment according to FIGS. 1 to 3 is too small and that the separation between the grapes and the leaves is not thorough enough. In order to remove such a drawback, the casing of the machine may be provided with a partition 10a so as to define a tunnel in which the path of the cut grapes rises first before sinking again, the casing enclosing more completely the parts carried by it, in particular, the end of the conveyor belt 6 dropping the grapes onto the lower conveyor belt 20 through an auxiliary port 19 which is smaller than in the case of the first embodiment disclosed. Furthermore, the machine according to the second embodiment includes a vertically adjustable shoe 35 and a cutter drive shaft 34.

FIG. 10 illustrates a system constituted by a tractor, a grape harvester and a semi-trailer provided with a tipping bucket. In fact, the grape harvester illustrated diagrammatically by the casing 10 and the elevator 35 is carried by a three-point coupling means, so that it is possible to resort to a semi-trailer 36 the girder of which is shaped so as to extend underneath the grape harvester.

At its rear end the semi-trailer 36 carries a tipping bucket 37. Said bucket is provided with two guiding rollers 38 slidably engaging the channel iron 39 associated with stationary rollers 39'. The upper end of the channel iron 39 is bent into crook-shape. When the jack 40 is actuated the bucket 37 is first raised without any rocking and when the rollers 39 reach the terminal portion of their path, the bucket rocks rearwardly. To allow this rising motion of the bucket 37, the machine is raised or tipped so as to shift the elevator 35 out of the path of the bucket;

In the embodiments described, the conveyor belt; the elevator and the cutting tool are driven mechanically but obviously this should not limit the scope of the invention and the drive may be provided hydraulically, electrically or through any other suitable means.

According to a modification, the springs 12,12 may be omitted, which springs are provided so as to ensure an elastic centering of the casing 10. As a matter of fact, tests executed by the applicant have shown that if the fan is set vertically as illustrated in FIGS. 1 to 4, it plays the part of a propeller and produces a shifting of the casing 10 along the rail 5, so that it is constantly urged towards the bases of the vines. Such an effect of the fan 9 is energetic enough for it to be of advantage to set a feeler at the end of the path of the shifted casing, which feeler would control a hydraulic jack adapted to make the casing recede. Such a feeler and jack associated therewith need not be described with any further detail since such arrangements are well known per se.

I claim:

1. A machine for harvesting clustered fruits from a vine on an oblique trellis and removing the cut clusters of grapes, comprising a chassis adapted to be suspended on a tractor through a three-point connection, a tunnel-shaped elongated casing carried by the chassis provided with an input port at one end and with two output ports at its opposite end, a fan associated with said casing and adapted to produce a draft of air through the casing from the input port towards the output ports, a cutting tool supported by and disposed about the input port of the casing and a conveyor belt extending longitudinally over the lower part of the casing starting from its end lying approximately underneath the location of the cutting tool towards a point registering with one output port to urge the grape clusters cut off the vine through the latter, the leaves cut off the vine being blown out by the blast of air through the other output port.

2. A grape harvesting machine as claimed in claim 1 comprising a rail pivotally secured to the chassis, a plurality of rollers carried by the casing and slidably carried by the rail and elastic means opposing the pivotal movement of the rail and the sliding of the chassis carried by the rollers.

3. A grape harvesting machine as claimed in claim 1 wherein the cutting tool slopes obliquely with reference to the longitudinal axis of the chassis.

4. A grape harvesting machine as claimed in claim 1, comprising a horizontal spindle carried transversely by the casing and to which the cutting tool is pivotally secured and a spring urging the tool into its operative position in parallelism with an oblique trellis.

5. A grape harvesting machine as claimed in claim 1, comprising a second transverse conveyor belt extending underneath the one output port of the casing to receive the grapes dropping off the front end of the first-mentioned conveyor belt, and a fluid-tight chute in which said second conveyor belt progresses.

6. A grape harvesting machine as claimed in claim 1, comprising a second transverse conveyor belt extending underneath the one output port of the casing to receive the grapes dropping off the front end of the firs-mentioned conveyor belt, a fluid-tight chute in which said second conveyor belt progresses and an elevator the lower end of which is fed by said second conveyor belt.

7. A grape harvesting machine as claimed in claim 1, comprising an auxiliary fan and means through which the blast of air passing out of said auxiliary fan is directed upwardly towards a point located to the front of and slightly underneath the lower end of the cutting tool.

8. A grape harvesting machine as claimed in claim 1, wherein the cutting tool includes a number of overlapping parallel smooth-edged circular blades.

9. A grape harvesting machine as claimed in claim 1, wherein the cutting tool includes a number of overlapping parallel smooth-edged circular blades, the machine including furthermore a yielding sheathed cable rotating said blades.

10. A grape harvesting machine as claimed in claim 1, wherein the fan is enclosed within the casing and includes vanes with leading cutting edges.

11. A grape harvesting machine as claimed in claim 1 wherein the tunnel-shaped casing is substantially horizontal.

12. A grape harvesting machine as claimed in claim 1 wherein the tunnel-shaped casing is substantially horizontal and carries the fan adjacent said one output port.

13. A grape harvesting machine as claimed in claim 1, wherein the tunnel-shaped casing is incurved in a vertical plane and shows its concavity downwardly the input port and said other output port being provided adjacent the opposite lower ends of the incurved casing, the fan being located within the upper, medial portion of the casing and the one output port being provided in an area between the fan and said other output port.

14. A grape harvesting machine as claimed in claim 1 wherein the tunnel shaped casing is substantially horizontal and the fan is adapted to rotate around a horizontal axis and produces a blast urging the casing transversely of the longitudinal axis of the chassis towards one of the vine rows.

* * * * *